(12) United States Patent
Robertson et al.

(10) Patent No.: US 7,405,928 B2
(45) Date of Patent: Jul. 29, 2008

(54) REMOVABLE INFORMATION STORAGE DEVICE ENCLOSURE

(75) Inventors: Kenneth G. Robertson, San Jose, CA (US); Raymond L. Gradwohl, Saratoga, CA (US); Jacques L. Gagne, Los Galtos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 10/836,340

(22) Filed: May 3, 2004

(65) Prior Publication Data

US 2005/0243506 A1    Nov. 3, 2005

(51) Int. Cl.
*H05K 7/12* (2006.01)

(52) U.S. Cl. ...................................... 361/685; 361/686
(58) Field of Classification Search ................. 361/685, 361/686; 206/334
See application file for complete search history.

(56) References Cited

U.S. PATENT DOCUMENTS

| | | | | |
|---|---|---|---|---|
| 4,089,464 A | * | 5/1978 | Teti et al. .................... 220/4.01 |
| 4,509,780 A | * | 4/1985 | Erwin ..................... 292/307 R |
| 4,585,122 A | * | 4/1986 | Stegenga ..................... 361/748 |
| 4,996,909 A | * | 3/1991 | Vache et al. ................. 454/184 |
| 5,243,495 A | * | 9/1993 | Read et al. ................... 361/685 |
| 5,491,608 A | | 2/1996 | Koyanagi et al. |
| 6,147,859 A | | 11/2000 | Abboud |
| 6,178,061 B1 | | 1/2001 | Obara |
| 6,560,092 B2 | * | 5/2003 | Itou et al. .................... 361/681 |
| 6,796,819 B2 | * | 9/2004 | Chen et al. ................... 439/160 |
| 6,891,721 B2 | * | 5/2005 | Huang ......................... 361/685 |
| 2002/0167792 A1 | | 11/2002 | Osterhout et al. |
| 2004/0047122 A1 | * | 3/2004 | Chen et al. ................... 361/685 |
| 2004/0255313 A1 | * | 12/2004 | Kaczeus et al. ............. 720/651 |

FOREIGN PATENT DOCUMENTS

FR        2 737 837        2/1997

OTHER PUBLICATIONS

"Frictional-Elastometric Shockmount System for Mechanical Isolation of a Fragile Device From Sources of Vibration and Shock", IBM Tech. Disclosure Bulletin, vol. 33, No. 9, Feb. 91.

* cited by examiner

*Primary Examiner*—Jayprakash N Gandhi
*Assistant Examiner*—Ingrid Wright

(57) ABSTRACT

A data storage cartridge includes a first housing and a second housing forming an inner chamber with an open front end and an open rear end. An information storage device is positioned within the chamber. A pair of intermediate strips are positioned lengthwise between the first housing and the second housing which hold together the first and second housing. A front end cap is positioned in the open front end to close the chamber. A rear end cap is positioned in the open rear end to close the chamber.

25 Claims, 12 Drawing Sheets

REMOVABLE INFORMATION STORAGE DEVICE ENCLOSURE

FIELD OF THE INVENTION

The present invention relates to enclosures for protecting an information storage device from mechanical shock and, more particularly, to an enclosure for a hard drive mechanism which is removable and space efficient.

BACKGROUND OF THE INVENTION

Information storage devices, especially hard disk drive mechanisms, are very sensitive to vibration and a mechanical shock. When such a hard disk drive mechanism is incorporated into a removable cartridge it can be easily dropped and damaged when it is removed or transported. Significant mechanical shock or vibration could damage either the read/write head mechanism and/or the rotatable disk of the hard disk chive mechanism.

SUMMARY OF THE INVENTION

It can be appreciated that a need exists for a removable cartridge for an information storage device which provides a high level of protection from shock and vibration.

It can also be appreciated that a need exists for a removable cartridge enclosing an information storage device in which the information storage device can be removed from the cartridge without tools.

In one aspect of the invention, a data storage cartridge includes a first housing and a second housing forming an inner chamber with an open front end and an open rear end. An information storage device is positioned within the chamber. A pair of intermediate strips are positioned lengthwise between the first housing and the second housing which hold together the first and second housing. A front end cap is positioned in the open front end to close the chamber. A rear end cap is positioned in the open rear end to close the chamber.

In another aspect to the invention, a method of assembling a data storage cartridge includes attaching a front end cap to an assembled base, attaching a rear end cap to the assembled base, positioning an information storage device in the assembled base, and sliding strips onto the top and the assembled base.

In yet another aspect of the invention, a data storage cartridge product assembled includes attaching a front end cap to an assembled base, attaching a rear end cap to the assembled base, positioning an information storage device in the assembled base, and sliding strips onto the top and the assembled base.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
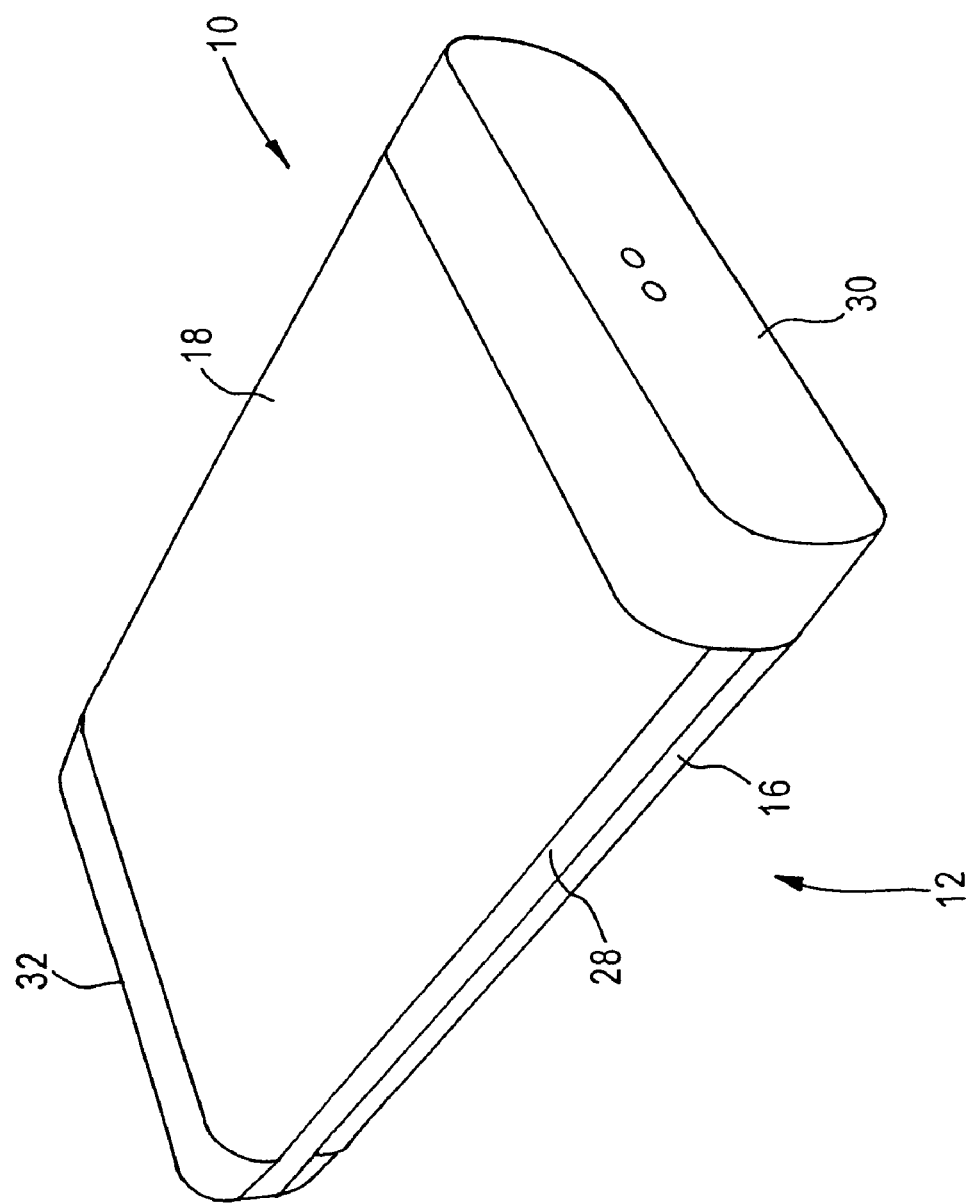
FIG. 1 is a top perspective view of the enclosure housing the hard disk drive according to the invention.

FIG. 1 is a top perspective view of an information storage device enclosure 10 according to the invention. It is to be understood that terms used herein such as "left", "right", "top" and "bottom" should be used in the relative sense. The information storage device enclosure 10 includes a cartridge 12 into which a hard disk drive or any other type of information storage device 14 (FIG. 4) is placed. The information storage device 14 can be a hard drive or any other type of information storage device. The information storage device 14 can be a hard drive or the information storage device enclosure 10 can be coupled by a cable (not shown) to a host computer system that is not illustrated.

The removable hard drive enclosure 10 includes the hard drive 14 mounted in the cartridge 12. The cartridge 12 can be a stand-alone product or slid into a sleeve which is housed in a computer or other system. The sleeve is fully disclosed in U.S. patent application Ser. No.10/836,342, entitled "Removable Expansion Module Latch System", filed on May 3, 2004, and U.S. patent application Ser. No. 10/836,344, entitled "Removable Expansion Module Usable as Internal and External Device", filed on May 3, 2004, each assigned to the present assignee, all of which are hereby incorporated by reference in their entirety, and all of which are being filed concurrently herewith.

The cartridge 12 includes a housing base 16 and housing top 18. The housing 16 forms a base into which the disk drive 14 is placed. Each of the housings 16, 18 has a C-shaped cross section and is preferably an aluminum extrusion. It is also envisioned that the housings 16, 18 can be made in an injection mold or die cast from aluminum. Each of the housings 16, 18 is preferably made of aluminum. The extruded aluminum housing 18 forms a top and extruded aluminum housing 16 forms a base. Each of the housings extrusions 16, 18 has two lip portions 1124 (shown in FIG. 11A) held together by strip 28. A front cap 30 and rear cap 32 complete the cartridge 12. Aluminum is preferred to form a thermally conductive path to the outside air.

Figure 2:
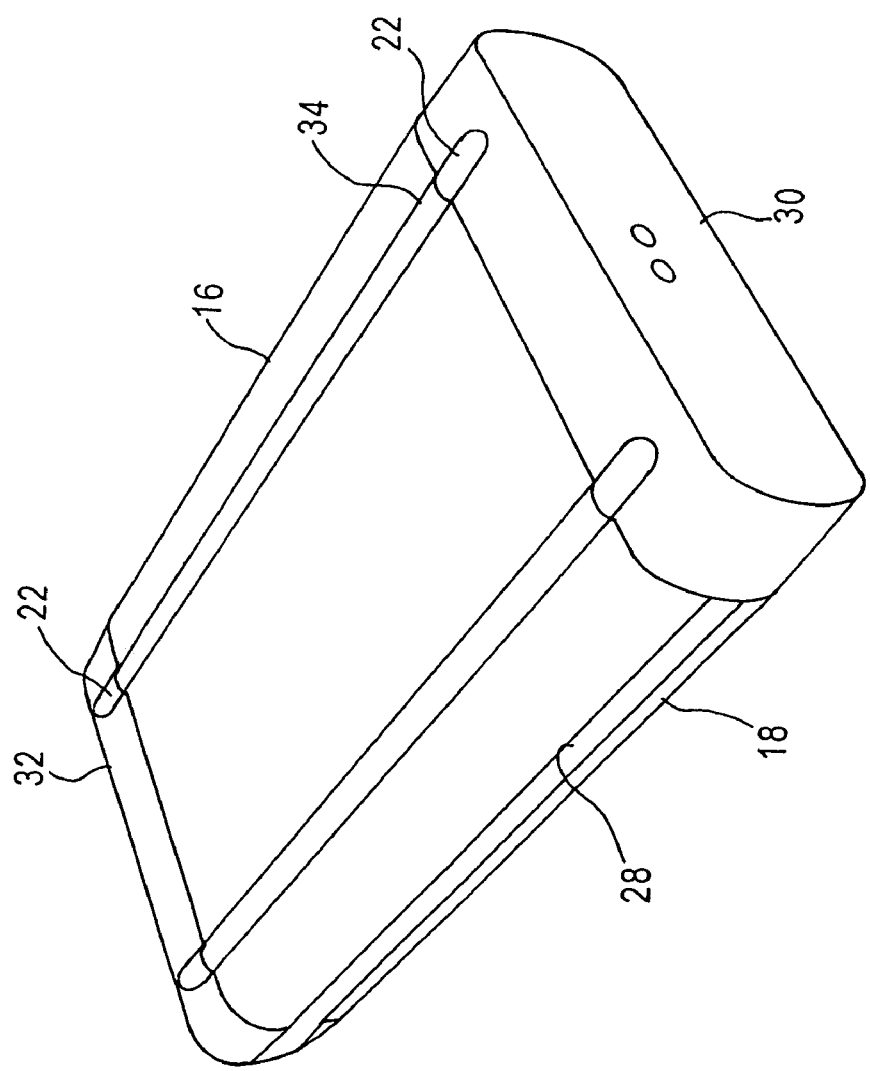
FIG. 2 is a bottom perspective view of the enclosure of FIG. 1.

FIG. 2 illustrates four feet 22 on each of the front cap 30 and rear cap 32 lining up with a ramp 34 in the housing base 16.

Figure 3:
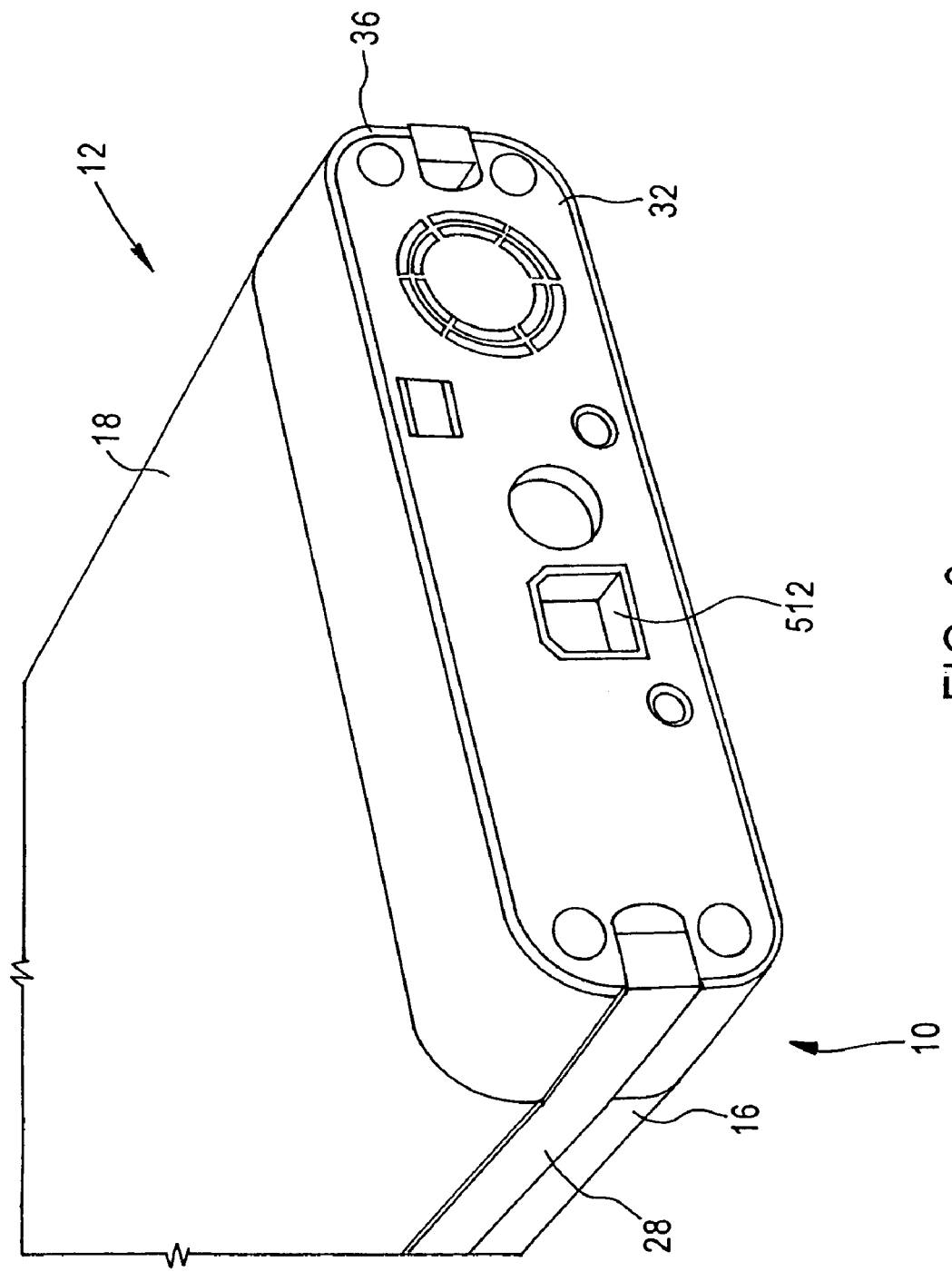
FIG. 3 is a perspective rear view of the rear end cap of FIGS. 1 and 2.

FIG. 3 illustrates the rear end cap 32 with connections to the computer and a fan outlet 36.

Figure 4:
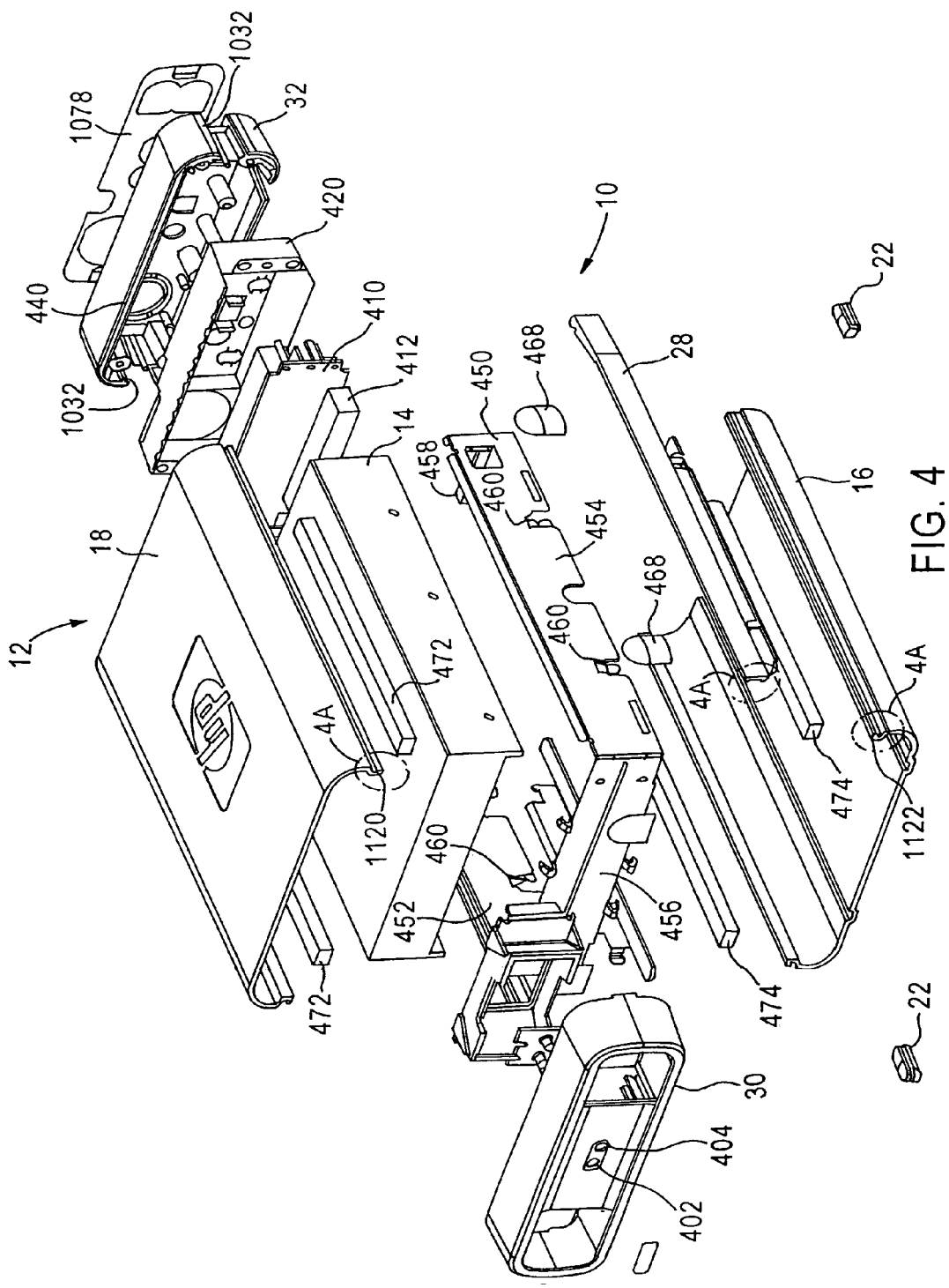
FIG. 4 is an exploded perspective view of the enclosure housing the hard drive according to the invention.

As depicted in FIG. 4, the aluminum extruded housings 16, 18 when held together with strips 28 form an inner chamber within. Each end, front and rear, of the assembled extruded aluminum housings 16, 18 has the front cap 30 and the rear cap 32, respectively connected to the assembled housing 16, 18 with the protected information storage device therein. The front end cap 30 can include latches (not shown) that assist in securing the cartridge 12 when slid into a sleeve which is fully disclosed in U.S. patent application Ser. Nos. 10/836,342 and 10/836,344. The front end 404 that show power on status and disk activity status. The rear end cap 32 includes a printed circuit board (PCB) 410 that acts as an interface between the IDE 412 and USB 512 buses (see FIG. 5). A sheet metal shield 420 is positioned between PCB 410 and rear cap 32 to provide electromagnetic interference (EMI) shielding. A decal 1078 is placed on an outer surface of rear cap 60. A plurality of screws (not shown) hold together rear cap 32, sheet metal shield 420, and PCB 410 and screw into the rear of bracket 450.

Rear cap 32 has a shelf 440 which has a corresponding shape to the housing 16, 18. In this manner, the cartridge 12 has a continuous outer surface. The front cap 30 has a similar shape to conform to a front surface of the assembled housing.

A sheet metal bracket 450 has U shape and has a left rearwardly extending portion 452 and a right rearwardly extending portion 454 connected by a connecting portion 456. Rear foam 458 is for shock protection and is mounted on rear tabs extending from 452, 454. Dimples 460 extend inwardly from portions 452, 454 to retain the hard drive 14. Advantageously, the hard drive is retained without screws and can be removed without special tools. Side foam portions 468 are placed between the bracket 450 and the hard drive 14. The side portions 468 are placed on left 452 and right 454 sides of the bracket 450, respectively. Foam portions 468 are also placed between the connecting portion 456 and the hard drive 14. Foam strips 472 are placed on top of the hard drive 14 to provide cushioning between the hard drive 14 and the top housing 18. Foam strips 474 are placed between the hard drive 14 and the base housing 16.

Figure 5:
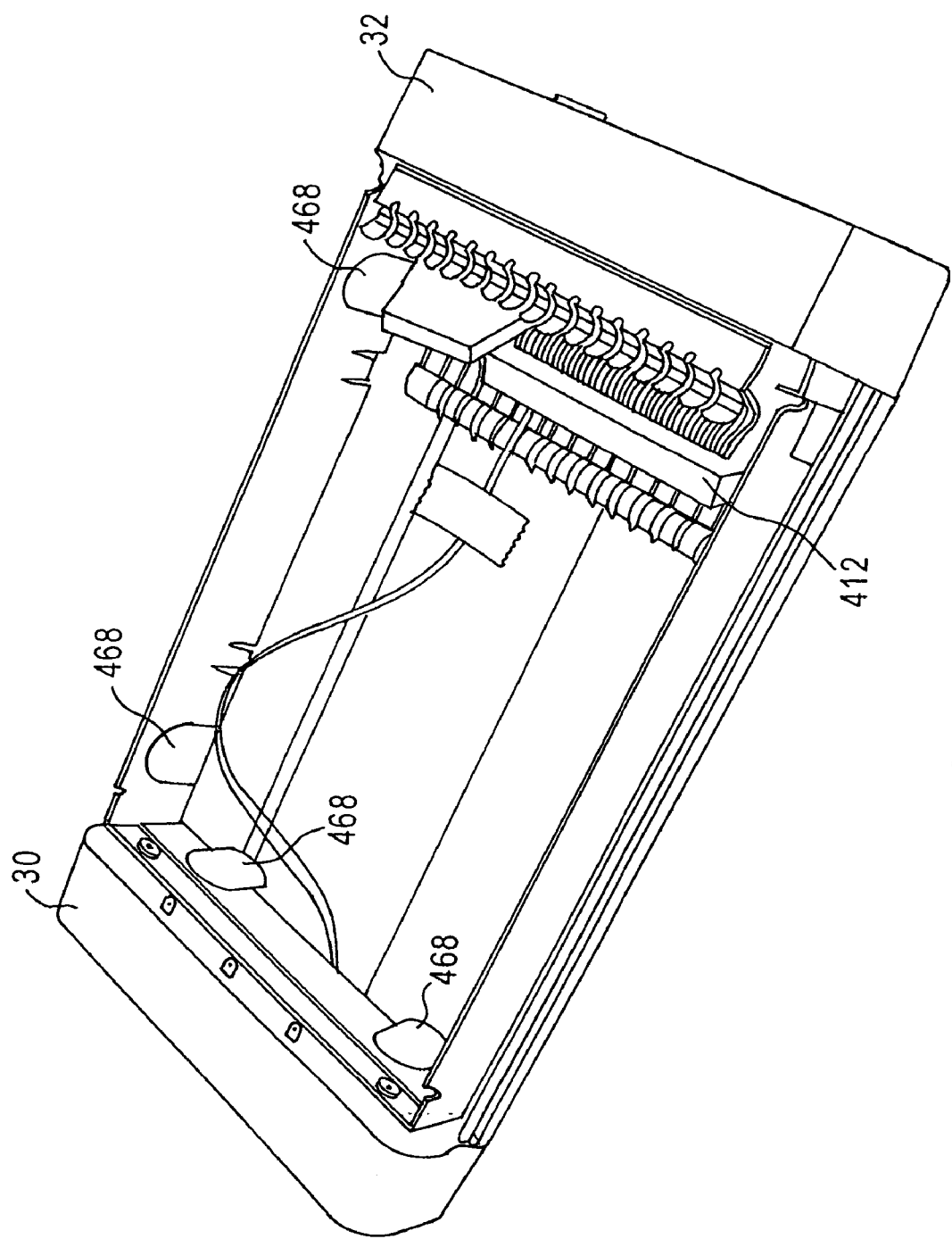
FIG. 5 is a top perspective view of the completed pre-assembly of the base before a hard drive is installed.

The base pre-assembly 500 is assembled as follows as depicted in FIG. 5. The bracket 450 is placed into the base housing 16. The rear end cap 32 is assembled including the sheet metal bracket 420 and PCB 410. Screws (not shown) connect the assembled rear end cap 32 to the bracket 450. The front end cap 30 is connected by screws to the central 456 of the bracket 450. Six silicone shock mounts 468 are placed inside the bracket 450. The hard disk drive 14 and foam pieces are then placed into the base 16. The top housing 18 is then placed upon the base 16 and the strips 28 but are slid onto lip portions 1124 preferably from the rear through grooves 1032. The strips can also be slid in from the front if grooves are placed in the front cap 30.

Figure 6:
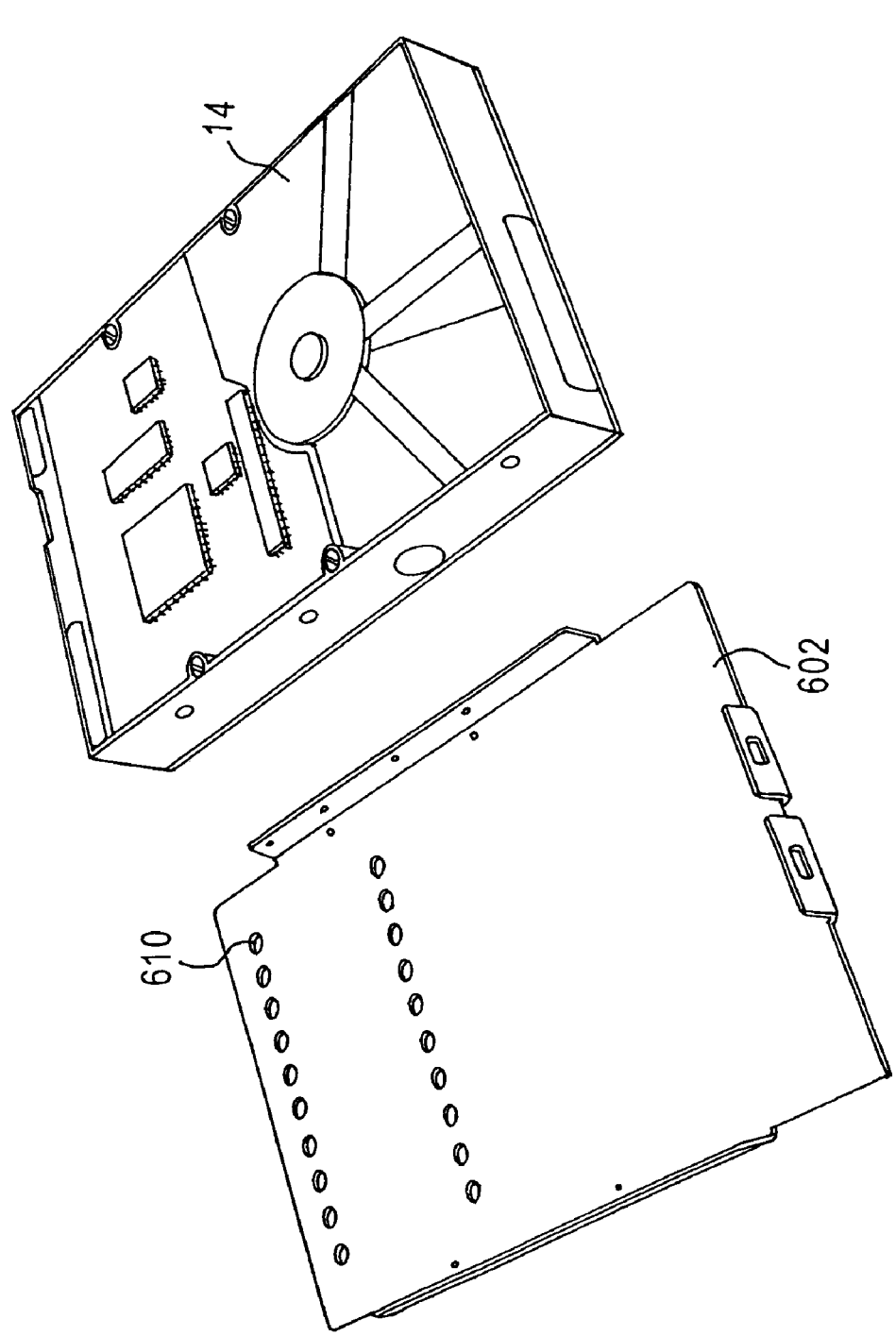
FIG. 6 is a perspective view of the hard drive and bottom cover before assembly.

FIG. 6 illustrates the hard disk drive 14 and a cover 602 having holes 610 for ventilation.

Figure 7:
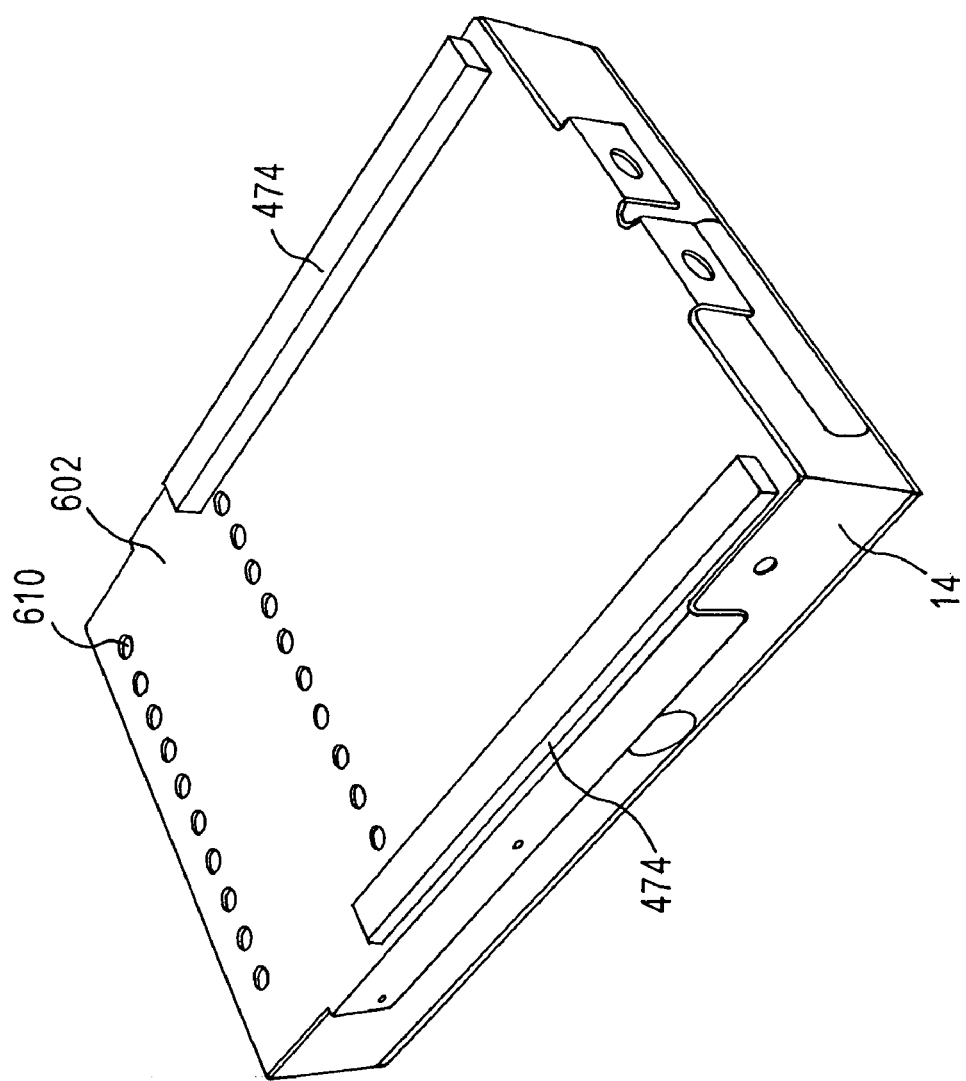
FIG. 7 is a perspective view of the assembled bottom cover and hard drive of FIG. 6 with shock protectors.

FIG. 7 illustrates the foam strips 474 being positioned on the assembled hard disk drive 14 and cover 602.

Figure 8:
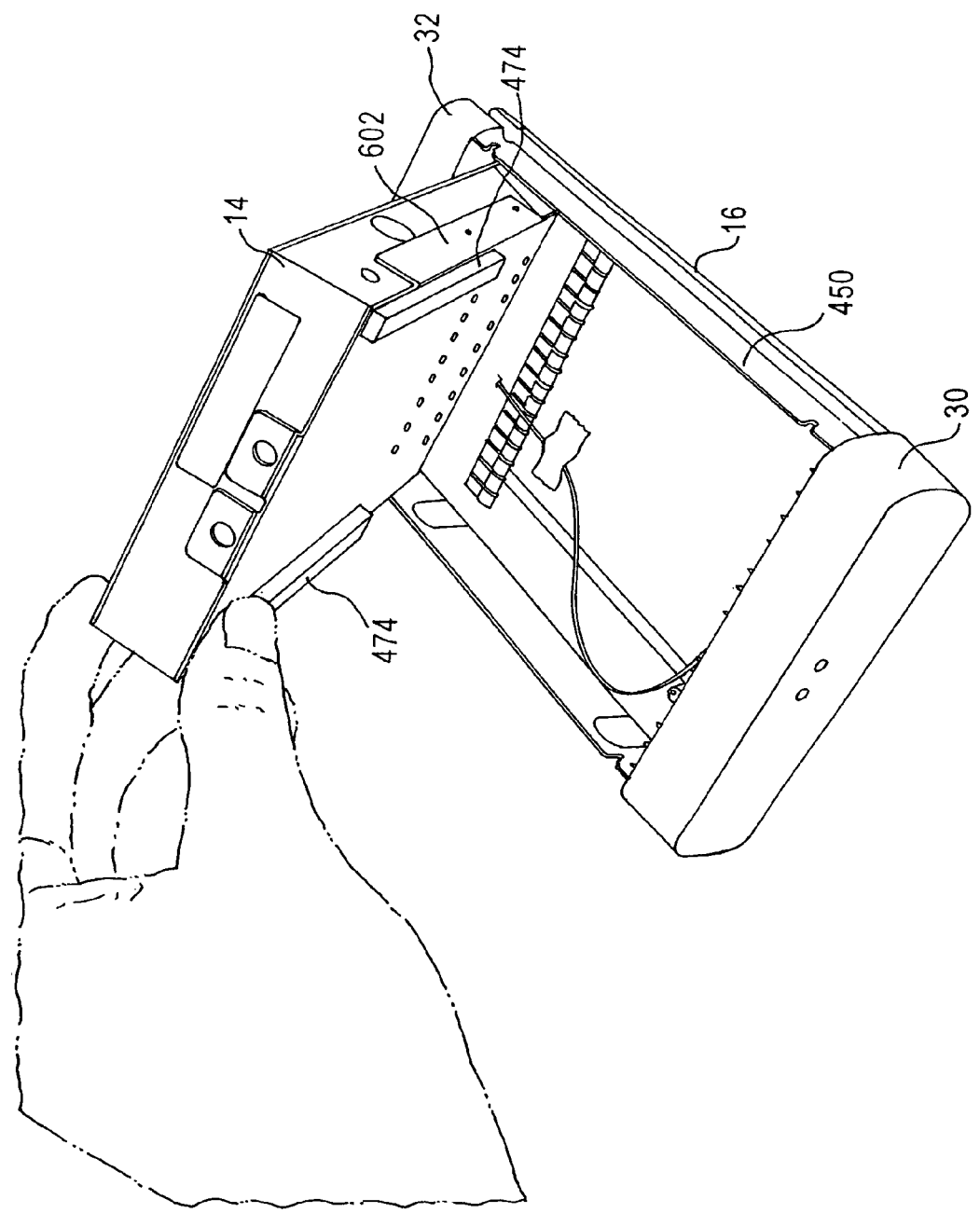
FIG. 8 is a perspective view illustrating the assembled hard drive and bottom cover of FIG. 7 being placed into the completed base pre-assembly of FIG. 5.

FIG. 8 illustrates the LED 402, 404 cables routed from the rear cap 32 to the front cap 30. The assembled hard drive 14 and cover 602 are connected to the HDD power connector and IDE connector at an angle and rotated into a flat position against the base housing 16 with the strips 474 in between.

Figure 9:
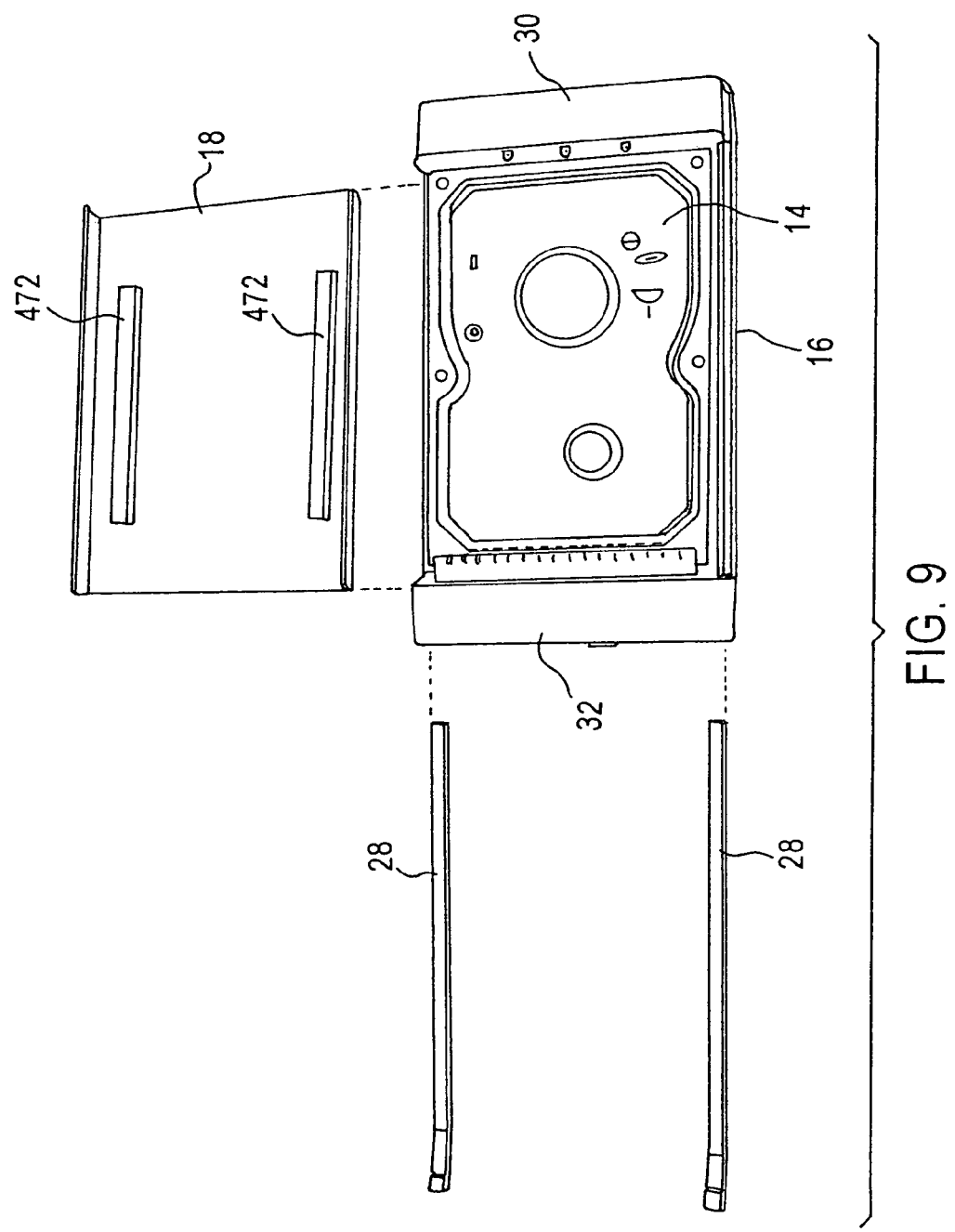
FIG. 9 is a top perspective view of the completed base pre-assembly, the top and the side strips before assembly.

FIG. 9 illustrates the hard disk drive 14 of FIG. 8 properly positioned in the pre-assembled base assembly. The cover 18 has the foam strips 472 attached thereto.

Figure 10:
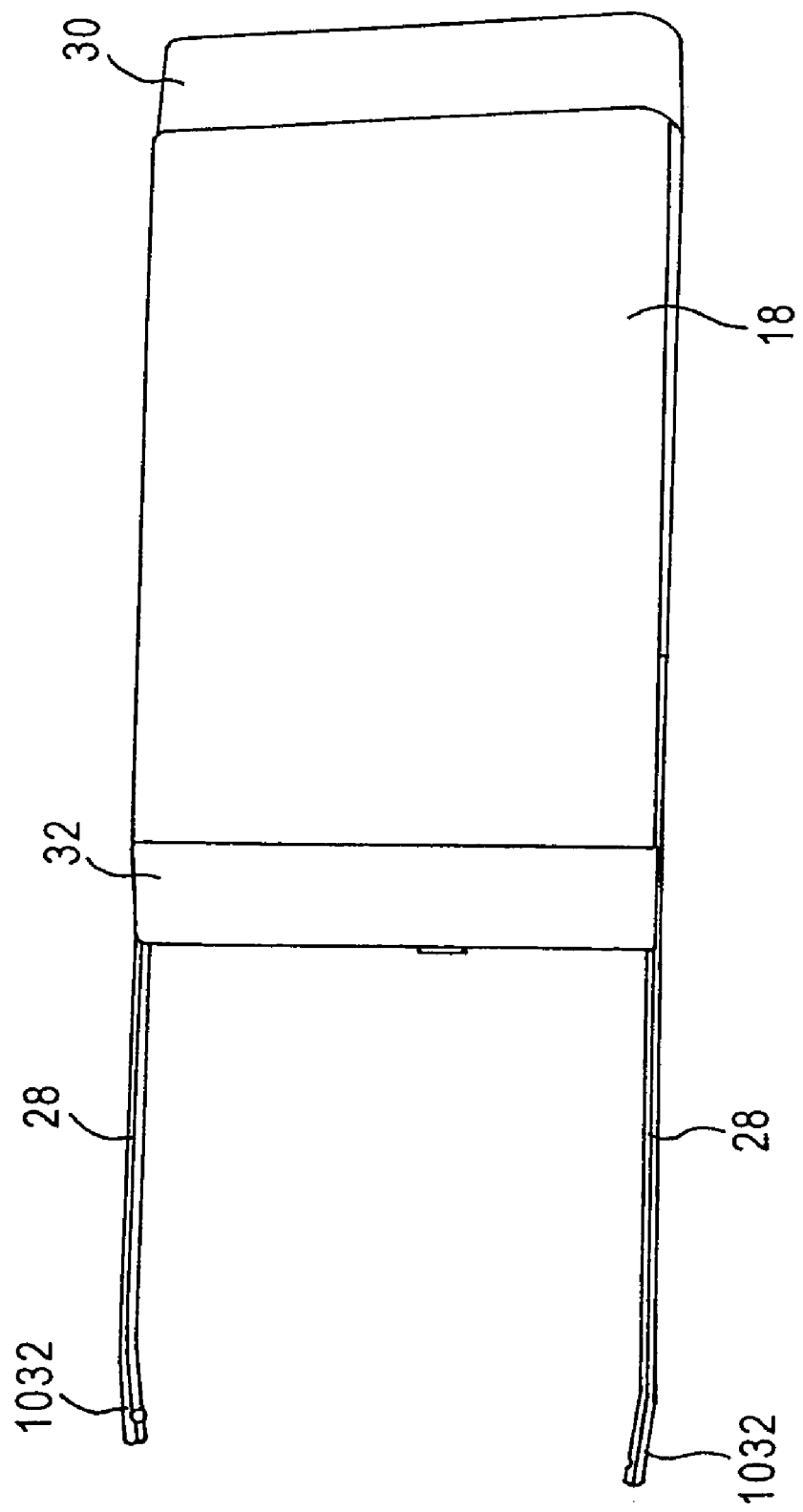
FIG. 10 is a top perspective view of the top assembled to the completed base pre-assembly with the strips partially pushed into place.

FIG. 10 illustrates the cover 18 placed on the pre-assembled base assembly with the hard drive 14 placed therein as illustrated in FIG. 9. The strips 28 are inserted through grooves 1032 (see FIG. 4) in end cap 32 and hold together the top housing 18 and the base housing 16.

Figure 11:
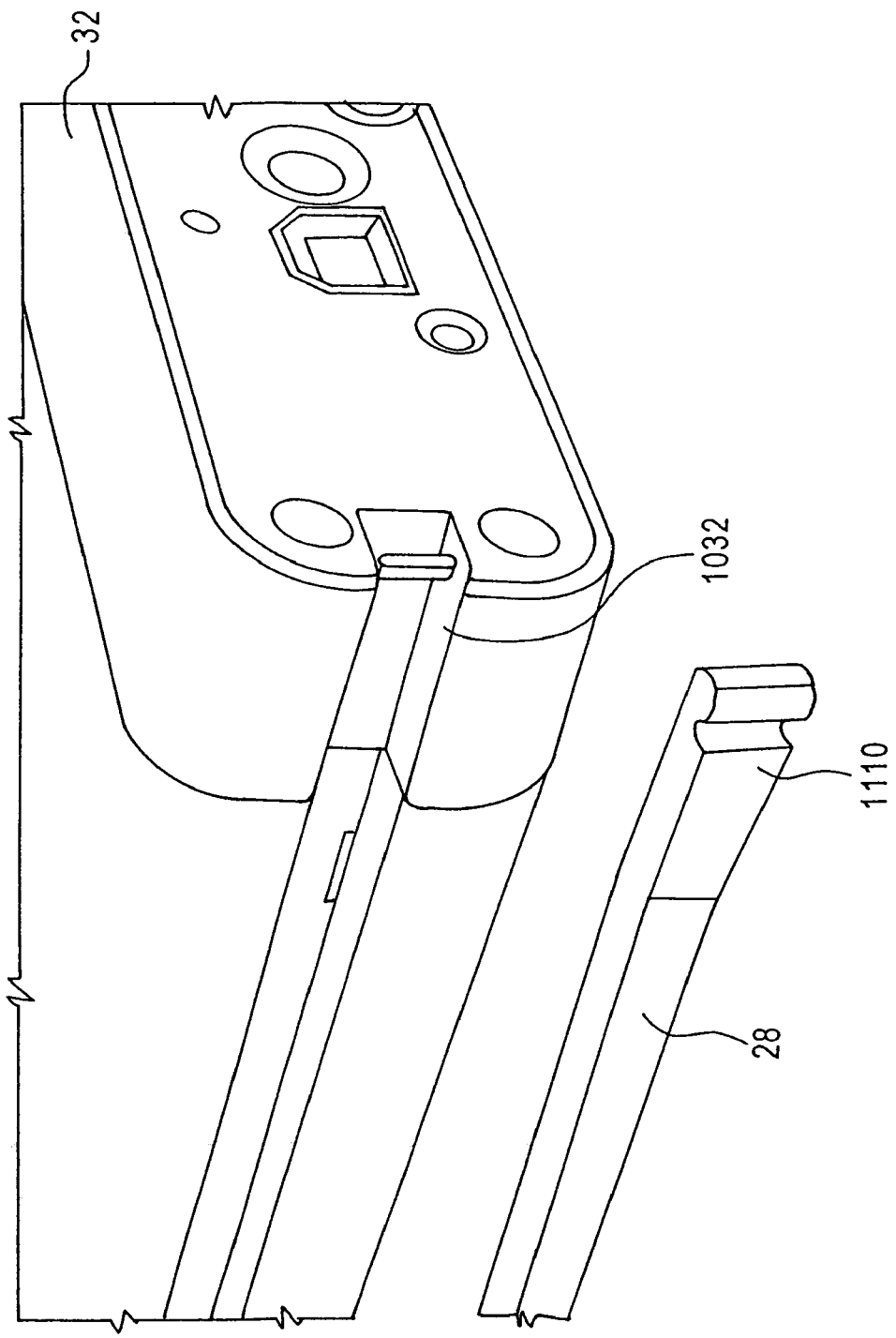
FIG. 11 is a perspective view of the rear cap and the side locks of the strips.

FIG. 11 illustrates the strip 28 having side locks 1110. The side locks snap and lock into the grooves 1032 to prevent the strips 28 from coming out.

The side locks snap into place and are covered by a rear label that acts as a security label as well, due to the fact that the user would have to damage the rear label to remove it to gain access to the side locks for disassembly, thereby signaling that someone tried to get into the cartridge.

Due to the top and bottom foam strips, the top housing 18 should be pressed downward while the strips 28 are inserted. A rear label is then placed over the ends of the side locks 1110 to cover them and the rear screw holes.

Figure 11A:
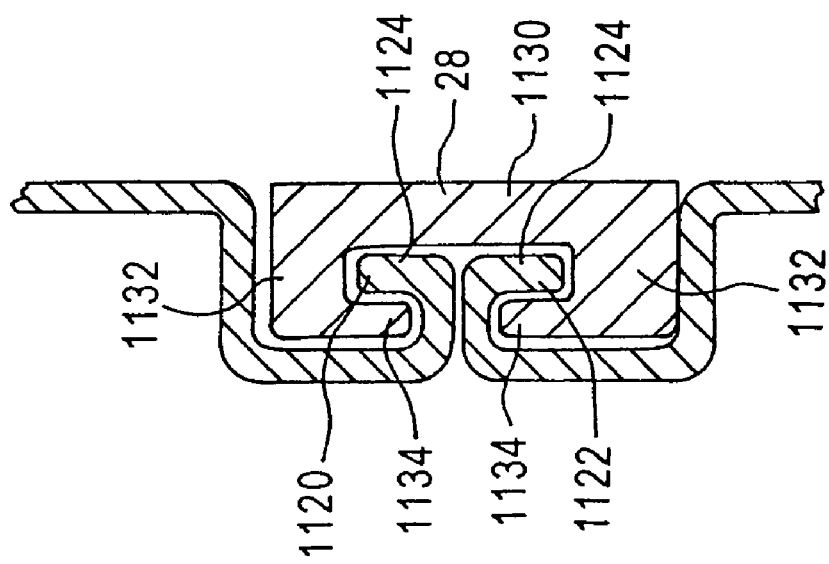
FIG. 11A is an enlarged sectional view of the dashed lines labeled 11A in FIG. 4 illustrating a strip holding a top housing to a bottom housing.

As illustrated in FIG. 11A, lip portions 1120, 1122 are located in recessed portions 1130 of housings 16, 18. Lip portions 1120, 1122 each include a lip 1124 spaced outwardly from housings 16, 18 within recessed portions 1130. Each lip 1124 forms a substantially continuous outer surface of the housing top 16 and the housing base 18, respectively lips 1124 extend in opposite directions as illustrated in FIG. 11A. The C-shaped strip 28 is slid onto lips 1124 when housings 16, 18 are placed one on top of another to hold housings 16, 18 together. C-shaped strip 28 has a central section 1130 and connecting portions 1132 connected to projections 1134. As illustrated in FIG. 11A, C-shaped strip 28 is placed into the lip portions 1120, 1122 from the front thereof and the lips 1124 are positioned between central section 1130, the connection portions 1132 and the projections 1134. Strips 28 can be sheet metal stampings, plastic, or aluminum extrusion parts. Advantageously, housings 16, 18 are held together without screws. Advantageously, as illustrated in FIG. 11A, strip 28 forms an essentially continuous outer surface of the cartridge 12 when holding together housings 16, 18. The outer surface of a strip 28 is substantially flush with the outer surfaces of housings 16, 18.

The present invention provides a number of technical advantages. One such technical advantage is that a hard disk drive mechanism within the removable cartridge is provided with excellent protection from physical shocks. In this regard, resilient elements which support the disk drive and bracket provide levels of resilience in different directions. Another advantage is that the hard disk drive can be removed from the cartridge without any special tools.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A data storage cartridge, comprising:
   a first housing and a second housing forming an inner chamber with an open front end and an open rear end;
   an information storage device positioned within said chamber;
   a pair of intermediate strips each positioned lengthwise along said first housing and said second housing and wherein each strip holds together said first and second housings, wherein the pair of strips are arranged to prevent the first housing from separating from a plane of the second housing formed at the lengthwise position of the pair of strips on the second housing;
   a front end cap positioned in said open front end to close said chamber; and
   a rear end cap positioned in said open rear end to close said chamber.

2. The data storage cartridge of claim 1, wherein said first housing and said second housing are extrusions.

3. The data storage cartridge of claim 1, wherein said first housing and said second housing each have lip portions and each of said pair of intermediate strips have a C-shape which interlocks with said lip portions and holds said first and second housing extrusions together.

4. The data storage cartridge of claim 1, further comprising resilient portions on opposite sides of said information storage device.

5. The data storage cartridge of claim 2, wherein said first and second housings are made of aluminum.

6. The data storage cartridge of claim 1, wherein said front end cap and said rear end cap are made of plastic.

7. The data storage cartridge of claim 1, wherein a bracket is adjacent to said information storage device and has a left portion and a right portion connected together by a connecting portion.

8. The data storage cartridge of claim 1, wherein said intermediate strips have snap sections which lock into said rear end cap.

9. The data storage cartridge of claim 1, wherein said information storage device is a hard drive.

10. The data storage cartridge of claim 1, wherein each of said strips is a stamped metal part or plastic or aluminum extrusion.

11. The data storage cartridge of claim 1, wherein said information storage device can be removed from said data storage cartridge without screws.

12. The data storage cartridge of claim 1, wherein said first and second housings and said strips form a substantially continuous outer surface.

13. The data storage cartridge of claim 3, wherein said first and second housings and said pair of strips form a substantially continuous outer surface.

14. The data storage cartridge of claim 1, wherein each of said strips include a snap section positioned to lock into one of said front and rear end cap.

15. The data storage cartridge of claim 14, further comprising a decal covering said snap sections.

16. A method of assembling a data storage cartridge comprising the steps of:
    attaching a front end cap to an assembled base;
    attaching a rear end cap to the assembled base;
    positioning an information storage device in the assembled base;
    positioning a top on the assembled base to enclose the information storage device; and
    sliding strips lengthwise along the top and the assembled base to connect the top to the assembled base and form an assembled data storage cartridge.

17. The method of claim 16, comprising the step of snapping side locks of the strips into one of the front and rear end cap.

18. The method of claim 16, wherein the top and the base are formed of extrusions.

19. A data storage cartridge product assembled according to the steps of:
    attaching a front end cap to an assembled base;
    attaching a rear end cap to the assembled base;
    positioning an information storage device in the assembled base;
    positioning a top on the assembled base to enclose the information storage device; and
    sliding strips lengthwise along the top and the assembled base to connect the top to the assembled base.

20. The data storage cartridge product of claim 19, comprising the step of snapping side locks of the strips into one of the front and rear end cap.

21. The date storage cartridge product of claim 19, wherein the top and the base are formed of extrusions.

22. A data storage cartridge, comprising:
    a first housing and a second housing forming an inner chamber with an open front end and an open rear end;
    an information storage device positioned within said chamber;
    a pair of intermediate strips each positioned lengthwise along said first housing and said second housing and wherein each strip holds together said first and second housings,
    wherein the pair of strips are arranged to prevent separation of the first housing from the second housing in at least a direction perpendicular to a plane of the pair of strips;
    a front end can positioned in said open front end to close said chamber; and
    a rear end cap positioned in said open rear end to close said chamber.

23. The data storage cartridge of claim 1, wherein the pair of strips positioned lengthwise retains the first housing to the second housing in at least a direction perpendicular to the length of the pair of strips.

24. The method of claim 16, wherein sliding strips lengthwise comprises preventing separation of the top from the assembled base in at least a direction perpendicular to a plane of the strips.

25. The data storage cartridge product of claim 19, wherein sliding strips lengthwise comprises retaining the top to the assembled base in at least a direction perpendicular to the length of the strips.

* * * * *

UNITED STATES PATENT AND TRADEMARK OFFICE
CERTIFICATE OF CORRECTION

PATENT NO.       : 7,405,928 B2
APPLICATION NO.  : 10/836340
DATED            : July 29, 2008
INVENTOR(S)      : Kenneth G. Robertson et al.

It is certified that error appears in the above-identified patent and that said Letters Patent is hereby corrected as shown below:

In column 1, line 14, delete "Infonnation" and insert -- Information --, therefor.

In column 1, line 21, delete "chive" and insert -- drive --, therefor.

In column 3, line 21, after "front end" insert -- cap 30 also has two LEDs 402, --.

In column 6, line 44, in Claim 22, after "front end" delete "can" and insert -- cap --, therefor.

Signed and Sealed this

Twenty-third Day of December, 2008

JON W. DUDAS
*Director of the United States Patent and Trademark Office*